(12) United States Patent
Mohamed et al.

(10) Patent No.: US 12,435,646 B1
(45) Date of Patent: Oct. 7, 2025

(54) SPIRAL GROOVED THRUST GENERATOR ON TURBINE WHEEL BACK PLATE

(71) Applicant: Garrett Transportation I Inc., Torrance, CA (US)

(72) Inventors: Ashraf Mohamed, Torrance, CA (US); Kevin Zhang, Torrance, CA (US); Matthew S. Oakes, Torrance, CA (US); Chris Meade, Torrance, CA (US)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 19/014,972

(22) Filed: Jan. 9, 2025

(51) Int. Cl.
  *F01D 25/24* (2006.01)
  *F02B 37/00* (2006.01)
  *F02B 37/12* (2006.01)

(52) U.S. Cl.
  CPC .............. *F01D 25/24* (2013.01); *F02B 37/00* (2013.01); *F02B 2037/122* (2013.01)

(58) Field of Classification Search
  CPC .................................. F01D 25/24; F02B 37/00
  See application file for complete search history.

(56) References Cited

U.S. PATENT DOCUMENTS

| | | | |
|---|---|---|---|
| 2,668,006 A | 2/1954 | Larrecq | |
| 4,256,441 A | 3/1981 | Arora | |
| 4,705,463 A | 11/1987 | Joco | |
| 6,231,302 B1 | 5/2001 | Bonardi | |
| 10,436,209 B1 | 10/2019 | Pinera et al. | |
| 10,677,257 B2 | 6/2020 | Armand et al. | |
| 11,078,807 B2 | 8/2021 | Ellwood, III | |
| 12,060,804 B2 | 8/2024 | Mizerovsky et al. | |
| 2018/0328371 A1 | 11/2018 | Race et al. | |

FOREIGN PATENT DOCUMENTS

| | | | | |
|---|---|---|---|---|
| CN | 103206271 A | * | 7/2013 | ........... F01D 25/186 |
| WO | WO-0019107 A1 | * | 4/2000 | ............ F04D 25/04 |

* cited by examiner

*Primary Examiner* — Ngoc T Nguyen

(74) *Attorney, Agent, or Firm* — Seager, Tufte & Wickhem LLP

(57) ABSTRACT

Turbochargers for use in an engine having an internal combustion engine. The design includes, in examples, a shaft having a rotation axis, a turbine housing, a compressor housing, a center housing extending from the turbine housing to the compressor housing with the shaft therethrough, a turbine wheel disposed in the turbine housing and operatively connected to the shaft, and a compressor wheel disposed in the compressor housing and operatively connected to the shaft. A turbine backplate structure is provided having one or more grooves adjacent a back side of the turbine wheel. The turbine backplate structure may be formed on the central housing, or may be a separate backplate installed in the central housing.

20 Claims, 16 Drawing Sheets

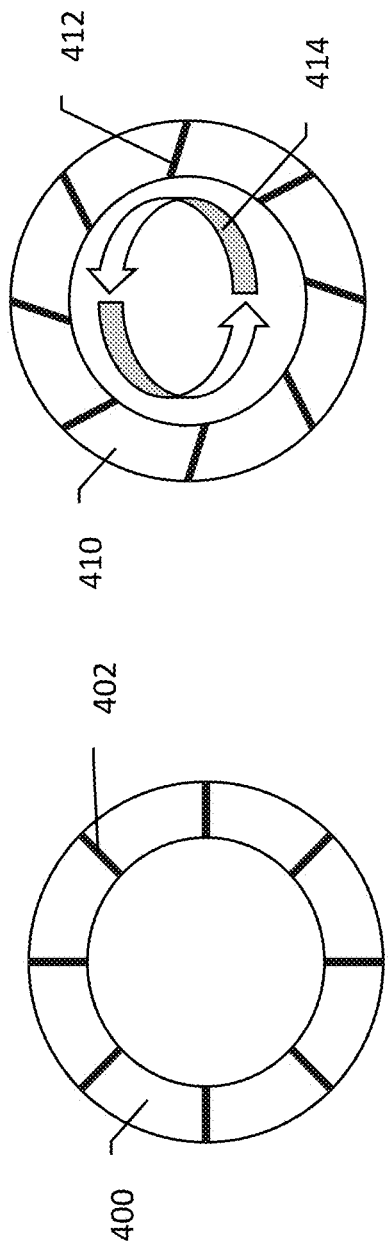
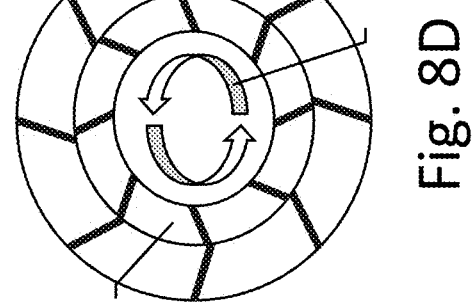
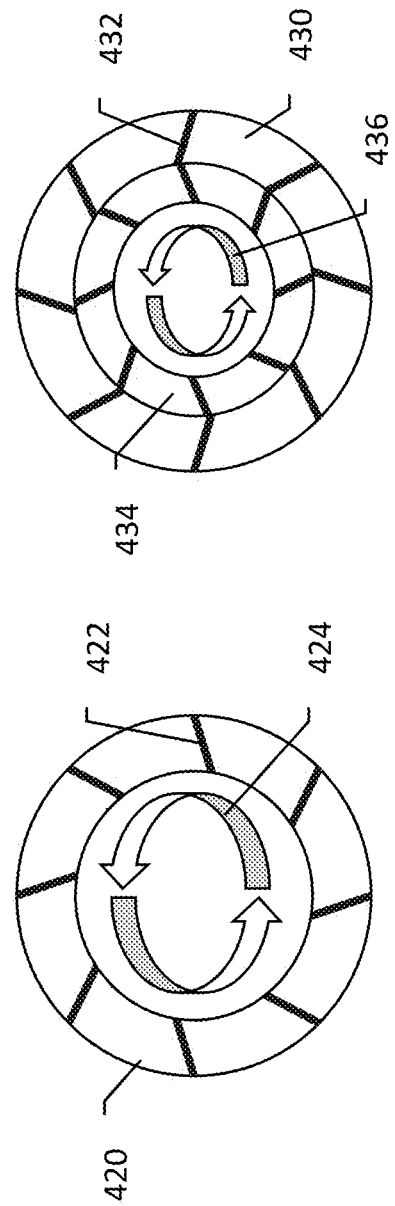
Fig. 8A
Fig. 8B
Fig. 8C
Fig. 8D

SPIRAL GROOVED THRUST GENERATOR ON TURBINE WHEEL BACK PLATE

BACKGROUND

Turbochargers use internal combustion engine exhaust gas to increase the amount of air that enters an engine, which allows for more fuel to be burned and more power to be produced. This is achieved by use of a compressor wheel to compress air entering the engine intake manifold by using torque delivered by a turbocharger shaft attached to a turbine wheel positioned in the engine exhaust air flow. E-Turbo arrangements have an electric motor to assist the gas-driven turbine in driving the compressor for example at times when exhaust gas flow is insufficient to produce the desired boost. In each of these systems, the turbocharger is subject to friction losses.

In a quest to reduce fuel consumption and emissions of automotive combustion engines, friction losses from many different sources need to be minimized. For modern designs of turbochargers commonly used in the automotive industry, reduction of friction losses results in better efficiency and contributes to a faster transient response.

Thrust force refers to the net axial force acting on the rotating assembly. In a turbocharger, thrust force is primarily generated by the pressure differences between the inlet and outlet sides of the compressor and turbine wheels. The thrust force pushes the shaft in one direction along its axis. Thrust force is countered and managed by a specialized component called a "thrust bearing" within the turbocharger design. Thrust bearing role in high-speed turbochargers is to withstand the axial force generated by the rotor group and maintain the axial position of the rotating group. The thrust bearing is one of the main contributors (around 70%) to the friction losses of a turbocharger.

At almost all operating condition the net thrust force is towards compressor (compressor is pulling), due to the higher pressure acting on the compressor than on the turbine and the larger backdisc area of the compressor relative to the turbine, scalloped turbine has even less area than full backdisc turbine wheels.

New and alternative designs to reduce friction losses in the turbocharger are desired.

Overview

The present inventors have recognized, among other things, that a problem to be solved is the need for new and/or alternative turbocharger designs. Such new or alternative turbocharger designs may be adapted to provide an axial force in the direction of the turbine using a turbine backplate structure comprising one or more grooves.

A first illustrative and non-limiting example takes the form of a turbocharger comprising a shaft having a rotational axis; a turbine housing; a compressor housing; a center housing connecting the turbine housing and compressor housing, with the shaft extending within the center housing; a turbine wheel disposed in the turbine housing and operatively connected to the shaft; and a compressor wheel disposed in the compressor housing and operatively connected to the shaft; further comprising a turbine backplate structure having one or more grooves adapted to generate an axial force along the rotational axis of the shaft.

Additionally or alternatively, the turbine backplate structure is formed on the center housing and facing the turbine wheel.

Additionally or alternatively, the turbine backplate structure is a separate piece positioned between the turbine wheel and the center housing, with the shaft passing through the separate piece.

Additionally or alternatively, the one or more grooves extend inward from a first circumference to a second circumference on the turbine backplate structure.

Additionally or alternatively, the one or more grooves have a depth which varies from a first end to a second end thereof.

Additionally or alternatively, the one or more grooves have a depth which does not vary from a first end to a second end thereof.

Additionally or alternatively, the turbine housing has an inlet and an outlet, the inlet adapted to receive exhaust gasses from a combustion chamber, air passing from the inlet to the outlet creates a force against the turbine wheel in a first direction, and the grooves extend from a first end at the first circumference to a second end at the second circumference in the first direction.

Additionally or alternatively, the turbine housing has an inlet and an outlet, the inlet adapted to receive exhaust gasses from a combustion chamber, air passing from the inlet to the outlet creates a force against the turbine wheel in a first direction, and the grooves extend from a first end at the first circumference to a second end at the second circumference in a direction opposite the first direction.

Additionally or alternatively, the one or more grooves each have an open end at the first circumference, and a closed end at the second circumference.

Additionally or alternatively, the one or more grooves each have a closed end at the first circumference, and a closed end at the second circumference.

Additionally or alternatively, the one or more grooves each have an open end at the first circumference, and an open end at the second circumference.

Additionally or alternatively, the one or more grooves each have a closed end at the first circumference, and an open end at the second circumference.

Additionally or alternatively, the turbine housing has an inlet and an outlet, and air passing from the inlet to the outlet creates a force against the turbine wheel in a first direction, and the one or more grooves include: an inner set of grooves with a first orientation; and an outer set of grooves with a second orientation.

Additionally or alternatively, the first orientation is in the first direction, and the second orientation is in the first direction.

Additionally or alternatively, the first orientation is in the first direction, and the second orientation is opposite of the first direction.

Additionally or alternatively, the first orientation is opposite of the first direction, and the second orientation is in the first direction.

Additionally or alternatively, the first orientation is opposite of the first direction, and the second orientation is opposite of the first direction.

Additionally or alternatively, the turbocharger further includes an electric motor coupled to the shaft, the electric motor configured to provide torque to the shaft in response to a control signal from a controller, wherein the controller is configured to generate the control signal to maintain a minimum speed on the shaft to thereby provide thrust bearing force using the grooves.

Another illustrative and non-limiting example takes the form of a turbocharger comprising: a shaft having a rotational axis; a turbine housing; a compressor housing; a center housing connecting the turbine housing and compressor housing, with the shaft extending within the center housing; a turbine wheel disposed in the turbine housing and operatively connected to the shaft; and a compressor wheel disposed in the compressor housing and operatively connected to the shaft; further comprising a means for providing axial force along the shaft in the direction of the turbine wheel, relative to the compressor wheel, located on or formed on the central housing in the turbine housing. The means for providing axial force may be a turbine backplate structure having one or more grooves adapted to generate an axial force along the rotational axis of the shaft, as described in the previous examples and further explained and disclosed below.

Another illustrative and non-limiting example takes the form of a method of controlling a turbocharger comprising: monitoring a speed of the turbocharger relative to a lower boundary; and controlling the speed of the turbocharger to stay above the lower boundary; wherein the turbocharger includes: a shaft having a rotational axis; a turbine housing; a compressor housing; a center housing connecting the turbine housing and compressor housing, with the shaft extending within the center housing; a turbine wheel disposed in the turbine housing and operatively connected to the shaft; a compressor wheel disposed in the compressor housing and operatively connected to the shaft; and a turbine backplate structure having one or more grooves adapted to generate an axial force along the rotational axis of the shaft when the turbocharger is operated at or above the lower boundary.

Additionally or alternatively, the step of controlling the speed of the turbocharger may be performed by activating or controlling an electric motor coupled to the shaft to deliver torque thereto to keep the speed at or above the lower boundary. Additionally or alternatively, the step of controlling the speed of the turbocharger may comprise controlling a position of a wastegate coupled to an exhaust stream of a combustion engine, wherein the turbine is positioned in the exhaust stream. Additionally or alternatively, the turbine may include a variable nozzle actuatable to control exhaust flow from a combustion engine to the turbine, and the step of controlling the speed of the turbocharger may comprise controlling the variable nozzle.

This overview is intended to introduce the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 8A-8G show several backplate or housing surface designs;

DETAILED DESCRIPTION

Figure 1:
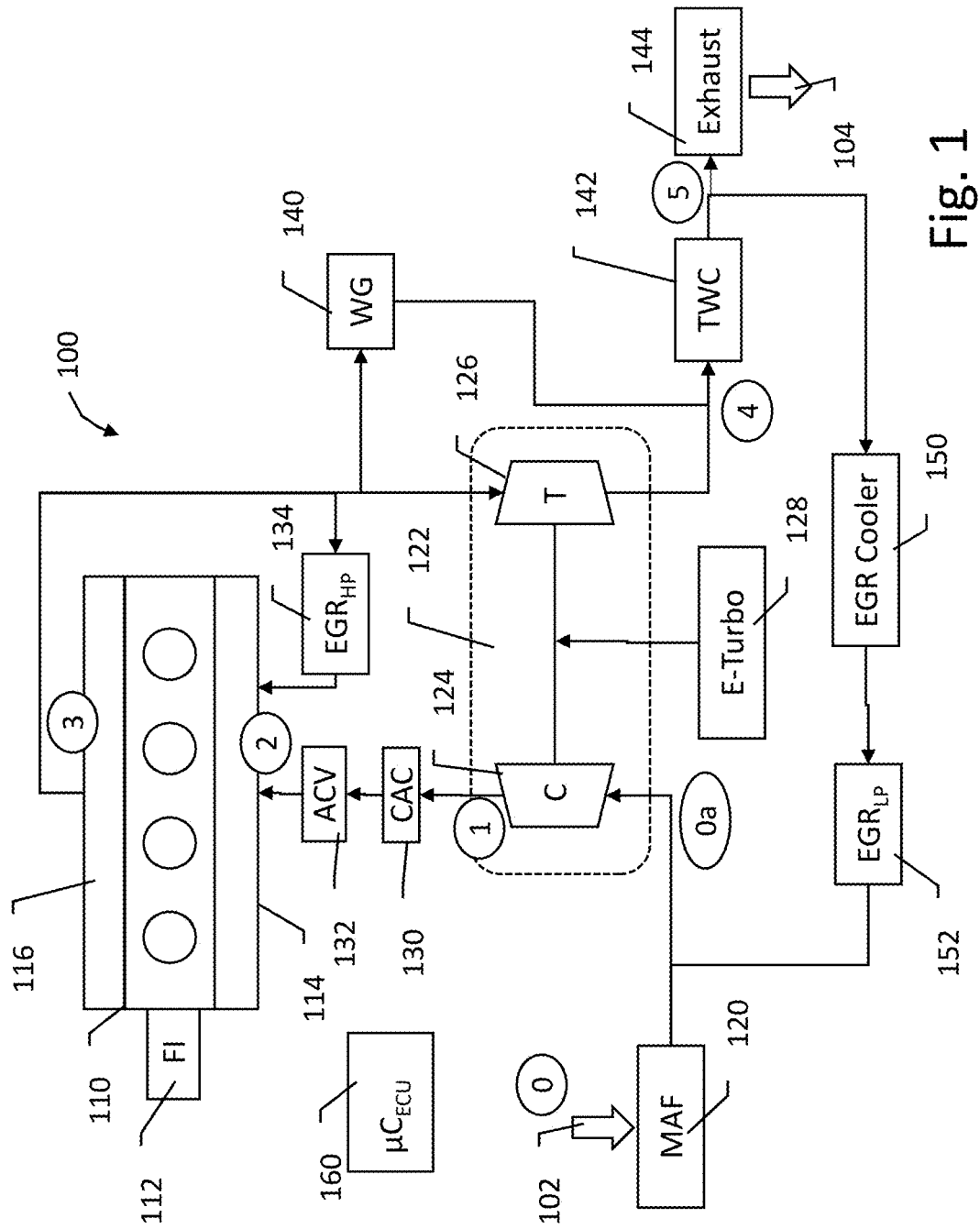
FIG. 1 shows an illustrative engine in schematic form.

FIG. 1 is shown for context of the present new designs for a turbocharger. Briefly, an engine system is shown with focus on the airflow throughout. A turbocharger 122 is provided to use torque obtained from a turbine wheel 126 positioned in the exhaust airflow to turn a compressor 124 that "charges" (increases the pressure of) incoming air to the engine system. There are a range of reasons for doing this, well known in the art. Greater detail of the various components shown is provided below.

Figure 2:
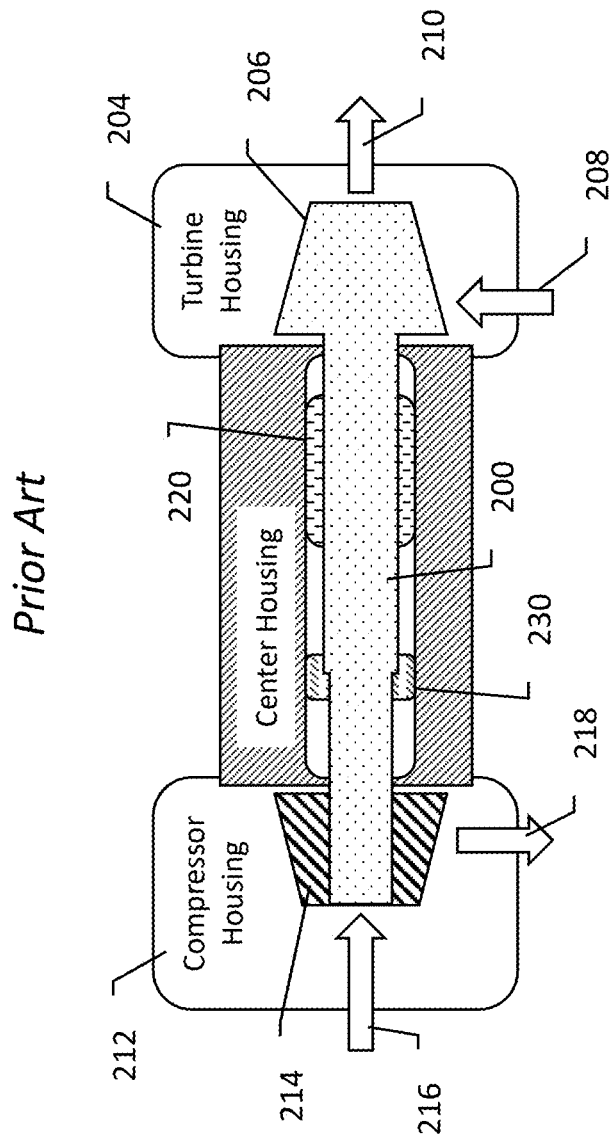
FIG. 2 illustrates details of a prior art turbocharger structure.

FIG. 2 illustrates components of the turbocharger itself. The turbocharger shaft 200 is connected to the turbine wheel 206, which resides in the turbine housing 204. The shaft 200 extends through a center housing to the compressor housing 212, where it is secured to the compressor wheel 214 which resides in the compressor housing 212. An exhaust gas inlet 208 allows exhaust gas into the turbine housing 204, and an outlet 210 lets the exhaust gas leave the turbine housing 204. Fresh air is received in the inlet 216 of the compressor housing 212, and compressed air exits the compressor housing 212 at charge air outlet 218. The turbine wheel is pushed to rotate by the escaping exhaust gas, converting this force to torque on the shaft 200, which then spins the compressor wheel to compress air passing through the compressor housing 212. A portion of the center housing is exposed at least in the turbine housing, which is secured to the center housing.

The shaft 200 is supported in the center housing by a journal bearing 220 and a thrust bearing 230. The journal bearing 220 supports the shaft 200 and prevents movement under radial loads (perpendicular to the axis of rotation). The thrust bearing 230 supports the shaft 200 to prevent movement under axial loads (along the axis of rotation). Each of these bearings 220, 230 thus provides a different direction of support to maintain the turbine wheel and compressor wheel in desired position to avoid contacting their respective housings. However, each bearing 220, 230 introduces friction tending to resist rotation of the shaft.

Each wheel 206, 214 generates axial forces that are transferred to the shaft 200. However, the turbine wheel 206 is often smaller than the compressor wheel 214, and operates at a lower pressure. As the turbocharger shaft 200 spins, a greater axial force is generated by the compressor wheel 214 than by the turbine wheel 206 due to these differences. Further, the turbine wheel 206 can age and is subject to scalloping, creating further imbalance of the axial forces. The thrust bearing 230 must be sized to address the entire range of such conditions, but introduces mechanical friction losses which increase with larger size of the thrust bearing 230. It is desirable to reduce the thrust bearing 230 in size to reduce drag. Further, if the thrust bearing 230 has to bear less axial load, this also reduces the friction created by the thrust bearing 230.

The shaft 200 must be supported, desirably with as low power losses as can be had, to safely avoid any contact of either the compressor wheel or the turbine wheel with the housing. The bearings 220, 230 may, for example, be hydrodynamic bearings or may use ball bearing designs. Hydrodynamic bearing systems may use engine oil to lubricate parts and control shaft motion. The thrust bearing 230 may be a separate part or integrated into the journal bearing 220, as in the case of the one piece "Z-Bearing." In some prior implementations, ball bearings combine the functions of journal bearing 220 and thrust bearing 230 into a single package. New and alternative designs that can reduce the demands, and thus size and/or power losses, due to these bearings 220, 230 are desired.

Figure 3:
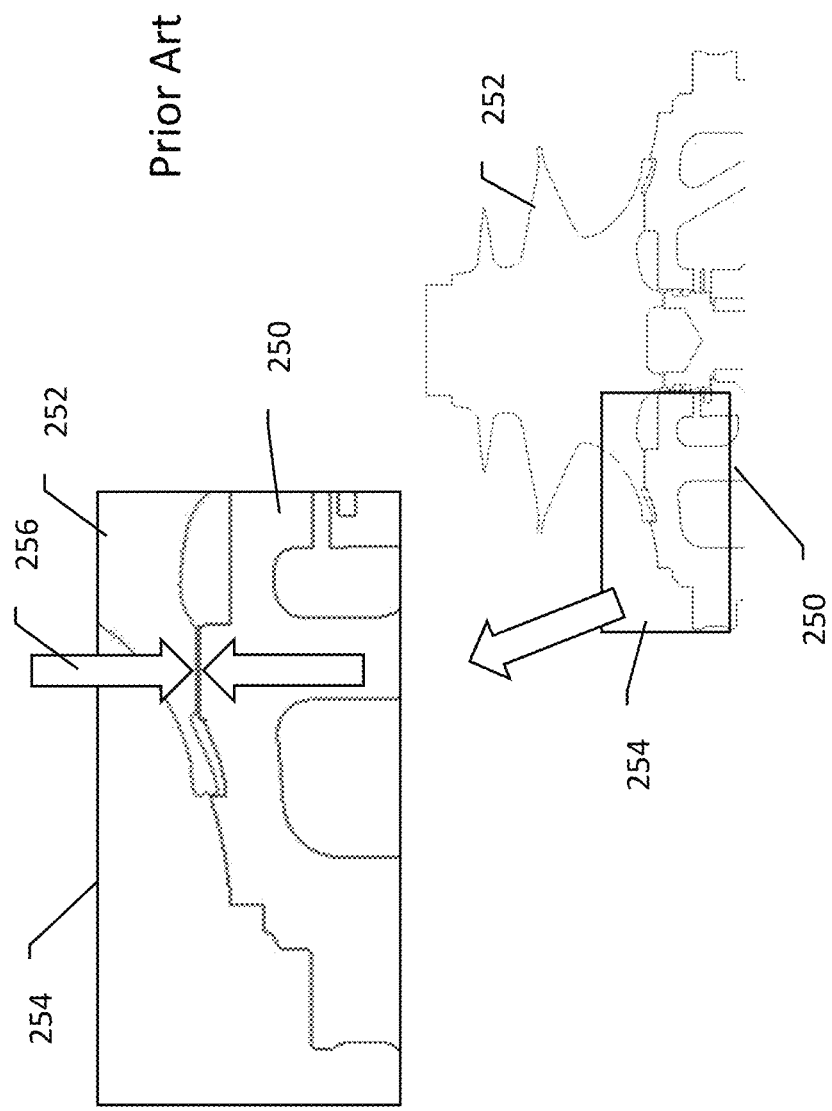
FIG. 3 shows details of the turbine wheel housing.

FIG. 3 shows a prior art turbine wheel and center housing in closer detail. As shown in the inset 254, the turbine center housing 250 is exposed within the turbine housing. The turbine center housing 250, or a backplate positioned thereon, is spaced from the back side of the turbine wheel 252 positioned with a clearance 256, selected to avoid friction and to reduce viscous friction losses between these surfaces under a range of operating conditions. Both surfaces (the center housing or backplate 250 and the back side of the turbine wheel 252) are generally smooth in most systems.

Figure 4:
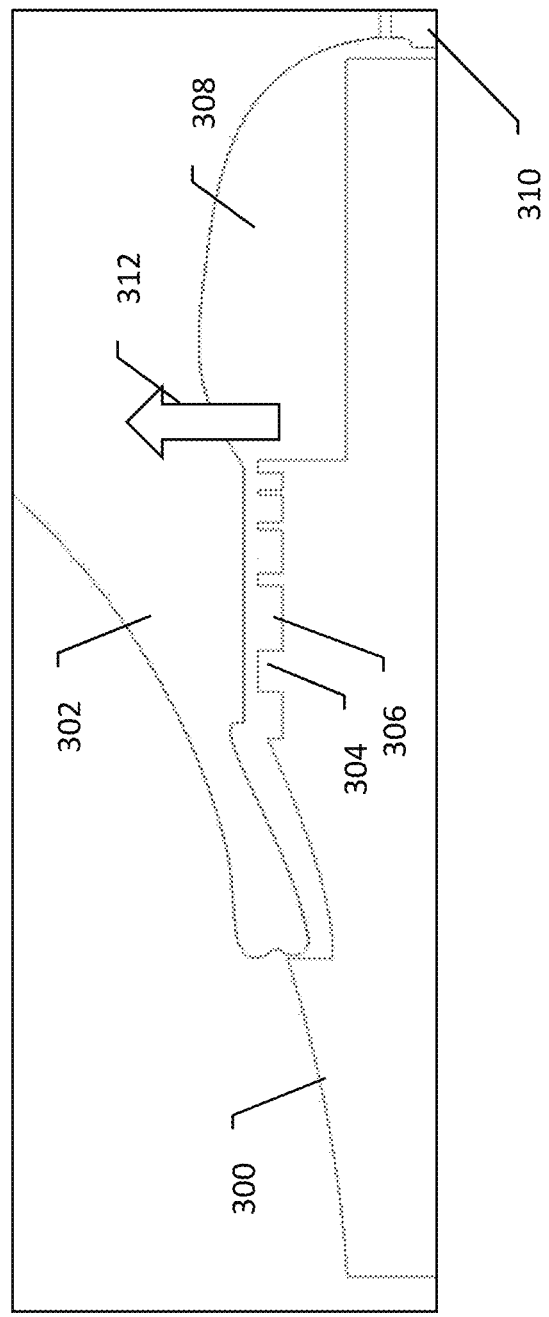
FIG. 4 shows a turbine wheel and housing in accordance with an example.

FIG. 4 shows an enhanced turbine wheel and center housing in accordance with an illustrative example. The turbine wheel is shown at 302, relative to center housing 300. The part of the center housing facing the turbine wheel 302, referred to as the backplate 304, includes one or more grooves 306 at an angle to the direction of rotation of turbine wheel 302. The grooves 306 act as a viscous pump (or compressor), which may be in a spiral, axial channel, herringbone or other design such as shown in several examples below. As the turbine wheel 302 rotates relative to the backplate 304, air (including exhaust gasses in the turbine flow) is automatically pumped against centrifugal force towards the turbine wheel shaft 310. There is no gas net flow out of the bearing except some leakage flow. This self-pressurizing effect of the grooved backplate generates a pressure force indicated at 312 that acts as a counter-force to the axial forces generated by the compressor wheel.

The axial force 312 is a result of two competing actions. With the turbine wheel 302 spinning, centrifugal force pushes the air in the dead space 308 outward in the grooves. Meanwhile, at the outer edges, the grooves pump the air in. These two flows push against each other, creating pressure and thus force 312. The structure thus provides a self-acting thrust bearing in the turbine back cavity.

When the turbine wheel is stopped, no force is generated by this structure. As a result, at least for use at start-up and/or low speeds, a thrust bearing may still be present in the turbocharger in some examples. The thrust bearing can be much smaller than would otherwise be needed for a given design. A smaller thrust bearing can be installed at lower cost, and introduces less friction than the larger thrust bearing that would otherwise be needed.

The grooves 306 can be symmetrical grooves, asymmetrical grooves and/or "partial" grooves. Symmetrical grooves are those in which all the designed grooves are with same shape, dimensions, and angle to the turbine rotational direction. Asymmetrical groove are those in which each groove or number of groves have different designs and angle to the turbine rotational direction. A partial groove may be closed at one end or the other, or extend only partly between the outer edge and inner edge of the backplate.

The grooves 306 may be constructed by any suitable manner, including laser or mechanical machining, for example and without limitation. Other methods, such as casting, assembly, additive manufacturing and/or etching can also be used. In an alternative example, the grooves 306 may be positioned instead on the back side of the turbine wheel 302, if desired.

If an E-Turbo is present, the turbocharger shaft 310 may also be subject to applied torque from an electric motor (further detailed below with reference to FIG. 1). In some examples, the E-Turbo may be used to generate torque at relatively low engine speeds and/or when the engine is off so that the force generated by the air thrust bearing is maintained above a desired minimum.

For example, an illustrative method may include monitoring a speed of the turbocharger relative to a lower boundary. Such monitoring may be performed using virtual sensing system (which relies on pressure changes and flow measurements, as well as models, to estimate turbocharger speed) and/or the use of a speed sensing device positioned along the shaft, for example and without limitation. At a controller, the measured speed can then be compared to the lower boundary. The lower boundary may be set using analytical or test-stand efforts to quantify each of the thrust generated at the turbine backplate structure as well as thrust generated by the compressor spinning and turbine spinning during use. For example, at a given speed, compressor inlet pressure, compressor outlet pressure, turbine inlet pressure, and turbine outlet pressure, the axial thrust of the compressor and turbine wheels can be measured, analytically determined, modelled, etc, to determine whether the operating conditions are desirable; if not, a higher speed may be needed to generate more axial thrust using the turbine backplate structure. Controlling turbocharger speed may include any of several methods. For example, the E-Turbo can be used to apply (or remove) torque from the turbocharger shaft to increase (or decrease) rotational speed. Turbocharger speed can also be controlled more indirectly by managing position of a wastegate and/or variable nozzle, using known methods for such control. The wastegate bypasses exhaust flow around the turbine, reducing torque generated at the turbine when open and increasing torque at the turbine when closed. The variable nozzle at the turbine inlet can modulate exhaust flow to the turbine, as desired.

Figure 5:
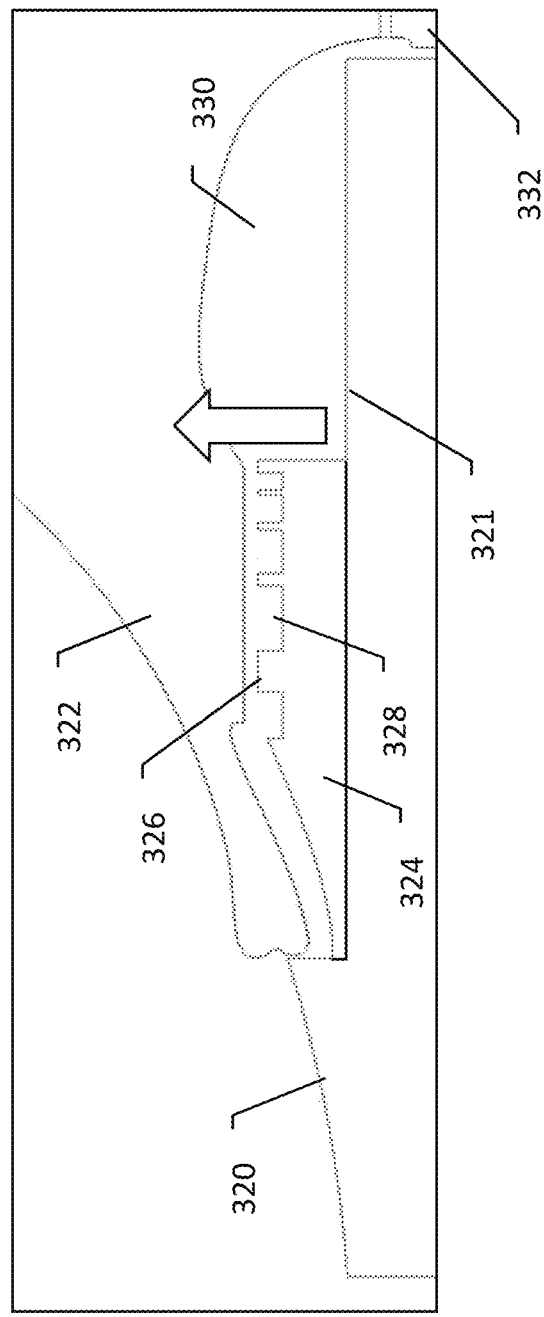
FIG. 5 shows a turbine wheel, housing and backplate in accordance with an example.

FIG. 5 shows a turbine wheel, center housing and backplate in accordance with an example. Here, the center housing shown at 320 has thereon a separate backplate 324, which has a surface 326 that faces the back side of the turbine wheel 322, with grooves 328. The function remains the same as described above in relation to FIG. 4. The separate backplate may 324 may define an inner circumference in which dead space 330 is defined between the turbine wheel, the housing 320, and the turbocharger shaft 332. The back plate 324 can be separately manufactured and then positioned in a hollow, slot or groove on the housing 320 and then held in place using bolts, studs, rivets, welding or any other suitable structure. This may aid in manufacturability, as the grooves 328 can be more readily made on the relatively smaller separate backplate. Moreover, interchangeable plates can be used in a single housing design, allowing for multiple builds and designs. If, for example, the grooves 328 are damaged during use, wear, or become corroded or dirty due to the exhaust gasses to which these are subjected, a replacement part can be positioned.

As used herein, the portion of the center housing on which grooves are constructed may be described as a turbine backplate structure, formed on the center housing. Likewise, a separate backplate which is then positioned between the turbine wheel and the center housing, and secured to the center housing, can be described as a turbine backplate structure.

Figure 6A:
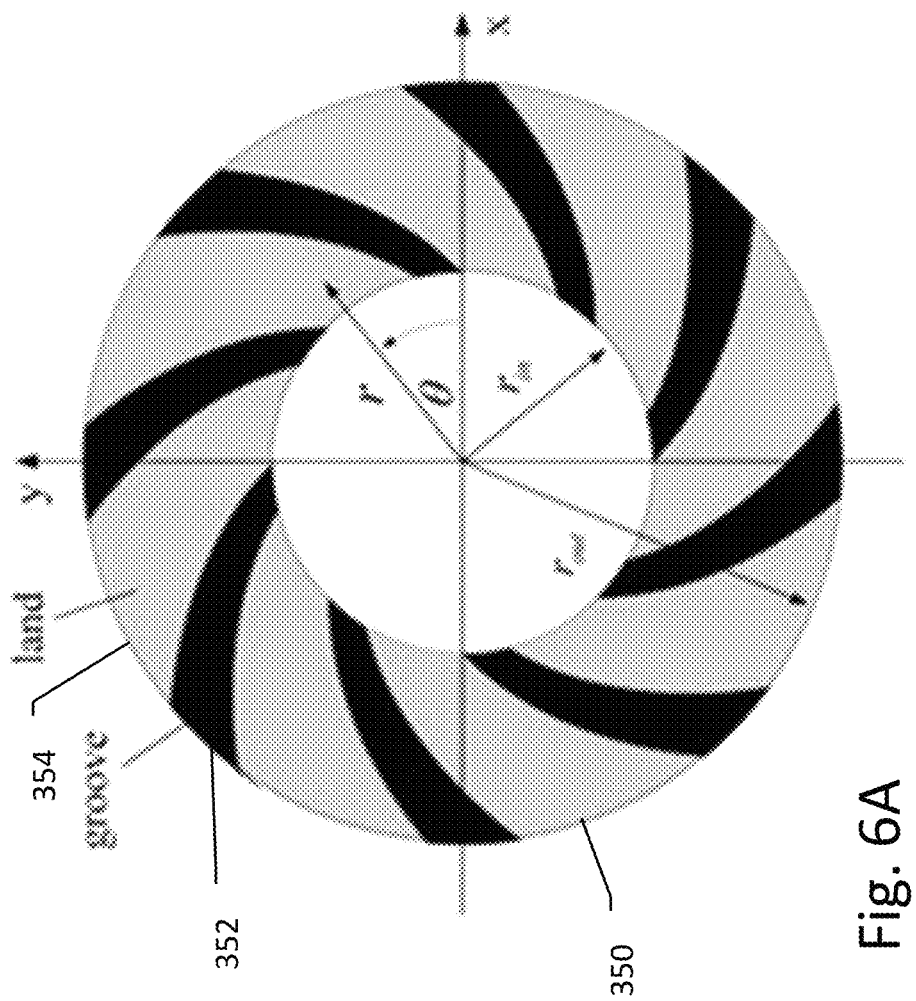
FIGS. 6A-6C show details for a turbine wheel housing or backplate structure.
Figure 6B:
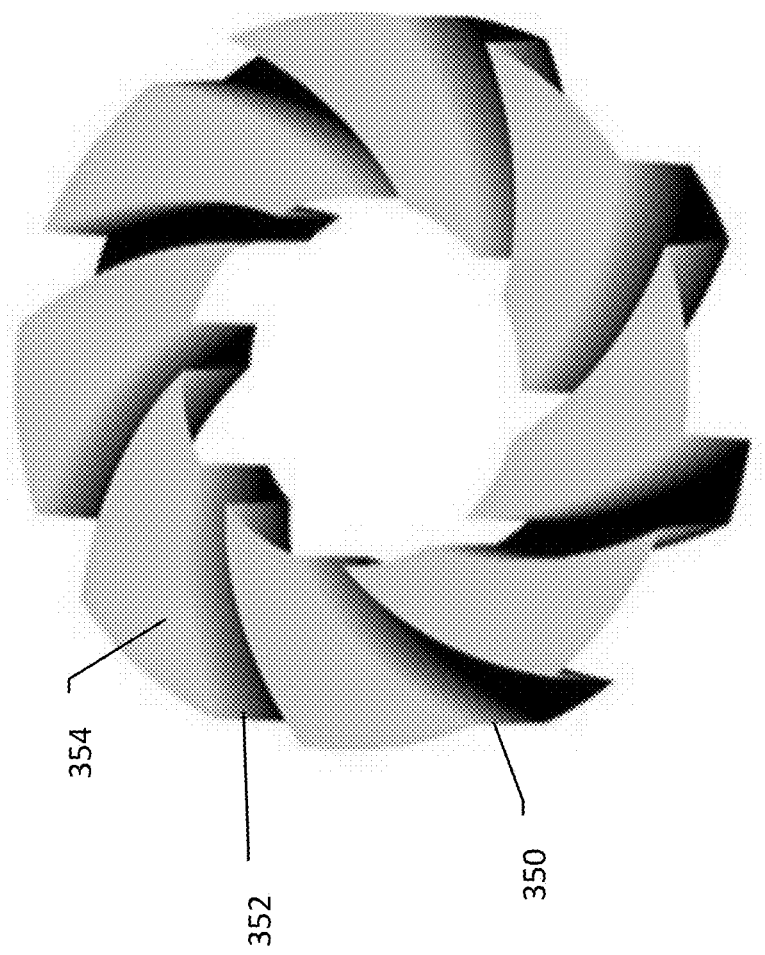
Figure 6C:
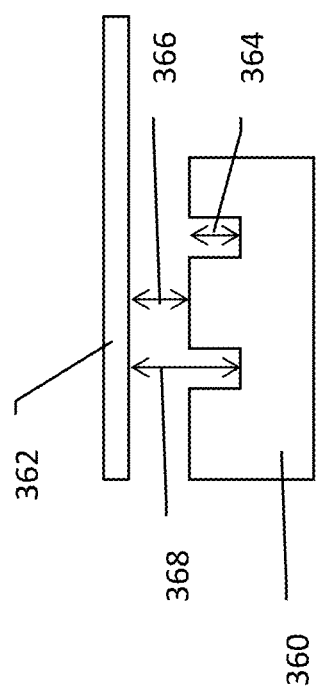

FIGS. 6A-6C show details for a turbine wheel housing or backplate structure. In the elevation view of FIG. 6A, the design has a surface 350, with alternating surface structures 354 sometimes referred to as the "lands", with spiral or other shaped grooves 352, as shown. This spiral design has grooves which increase in width from the inner edge of each spiral groove 354 to the outer edge thereof. Other designs can be used, as desired.

A perspective view in FIG. 6B shows just the surfaces of the device, again with the lands 354 separated by the spiral grooves 352. The surfaces are highlighted here. While a shell-type structure may be used, some examples use solid lands.

FIG. 6C shows some of the variables that can be considered when designing the backplate or housing structure 360 (or, in the alternative, the turbine wheel 362). The depth of each groove is highlighted at 364. The resulting clearance 366 between the lands and the turbine wheel back side 362 is shown as well, with total depth from groove base to the turbine wheel at 368. Greater depth of the grooves may provide greater pressure as more air is drawn into the space at each end.

The depth 364 be consistent along the length of a groove, or may vary in different examples along the length of a groove, such as:
From a first, lesser depth to a second greater depth from the inner end thereof to the outer end thereof;
From a first, greater depth to a second lesser depth from the inner end thereof to the outer end thereof;
From a first, greater depth at an inner end, to a second, lesser depth at an intermediate point, and again to a third greater depth at an outer end, wherein one of the following holds:
  a) the first and third depth are the same;
  b) the first depth is less than the third depth; or
  c) the first depth is greater than the third depth.
From a first, lesser depth at an inner end, to a second, greater depth at an intermediate point, and again to a third lesser depth at an outer end, wherein one of the following holds:
  a) the first and third depth are the same;
  b) the first depth is less than the third depth; or
  c) the first depth is greater than the third depth.

Each groove may have a width as well, which may be consistent along a length thereof or may vary such as:
From a first width at an inner end thereof to a second, greater width at an outer end thereof, or
From a first width at an inner end thereof to a second, greater width at an outer end thereof, or
From a first width at an inner end thereof, to a second, intermediate width, to a third width at an outer end thereof wherein one of the following holds:
  a) the intermediate width is greater than the first width, which is greater than the third width;
  b) the intermediate width is greater than the third width, which is greater than the first width;
  c) the intermediate width is greater than the third width, which is equal to the first width;
  d) the intermediate width is less than the first width, which is less than the third width;
  e) the intermediate width is less than the third width, which is less than the second width; or
  f) the intermediate width is less than the second width, which is equal to the third width.

Other combinations and variations can be used, as desired, including with variations in both width and depth along the length of a groove.

It should be noted that the design uses the exhaust air for bearing, rather than a lubricant, oil, etc., providing a free spinning action on the exhaust side of the engine air flow. By omitting lubricant, interaction of lubricant with exhaust air gas constituents and/or capture of particulates or soot in the exhaust air flow by a lubricant can be avoided. While this is usually not an issue due to the higher pressure in the turbine housing relative to the center housing, such considerations may be beneficial.

Soot buildup, if it arises, may be handled by periodic cleaning of surfaces. A cleaning fluid may be injected, for example, when soot buildup arises and/or as a periodic maintenance step. If a variable nozzle turbine is used, or a wastegate, exhaust pressure can be manipulated by opening or closing vanes and/or the wastegate as part of a pressure-induced clean out of soot, if desired.

Aging may be modeled as a trigger for any such cleaning or maintenance process. For example, by continually obtaining and storing data regarding combustion behavior (temperature and fuel mix, for example), the amount of soot likely produced may be estimated allowing analysis of needed cycles for cleaning or other maintenance. A high pressure in the exhaust may, on the other hand, aid in blowing out any buildup of soot.

Another maintenance factor may be that of the estimated remaining or unburnt fuel fraction in exhaust, which can be monitored using an oxygen sensor (UEGO, for example) in the exhaust airflow. More unburnt fuel exiting the engine may encourage buildup, requiring additional or more frequent maintenance, for example.

Figure 7:
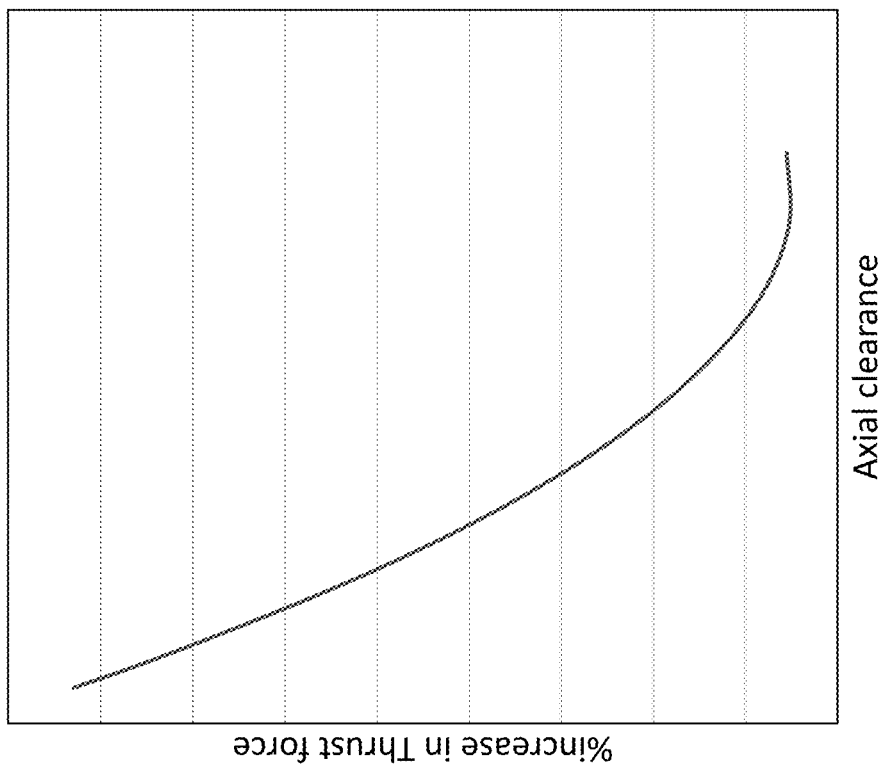
FIG. 7 is a graph showing increases in axial thrust as a function of clearance.

FIG. 7 is a graph showing increases in axial thrust as a function of turbine wheel (backdesk) to backplate clearance. The chart illustrates that with the particular groove structure and a given turbine design/housing, the axial thrust that is generated increases as the clearance is reduced, meaning that with this bearing, the amount of force resisting movement to close the clearance gap increases as the gap is reduced. This provides, in essence, negative feedback to any vibration or axial thrust which would reduce the clearance gap between the parts.

FIGS. 8A-8G show several backplate or center housing surface designs. The example of FIG. 8A uses straight grooves 402 on the backplate or center housing surface 400. The straight grooves extend in a line from a center-point of the surface 400. Other examples may provide more of a spiral shape. The number of grooves can vary, for example, any of 1, 2, 3, 4, 5, 6, 7, or 8 grooves can be used, or more, if desired.

FIG. 8B shows a backplate 410 with spiral grooves 412. The direction of turbine wheel motion is shown at 414. Thus, here, the spiral grooves 412 angle in the same direction of turbine wheel rotation 414 from the outer edge of the backplate 410 to the inner edge of the backplate 410.

FIG. 8C shows a backplate 420 with spiral grooves 422. The direction of turbine wheel motion is shown at 424. Thus, here, the spiral grooves 422 angle in the opposite direction as turbine wheel motion 424 from the outer edge of the backplate 420 to the inner edge of the backplate 420.

FIG. 8D shows a backplate 430 with first, outer spiral grooves 432 and second, inner spiral grooves 434. The direction of turbine wheel motion is shown at 436. Thus, here, the angle of inner spiral grooves 434 is in the opposite direction as turbine wheel rotation 436, and the angle of outer spiral grooves 432 is in the same direction as turbine wheel rotation 436. The opposing grooves 432, 434 may provide a greater area of air bearing between the turbine wheel and the backplate and/or turbine housing.

Figure 8E:
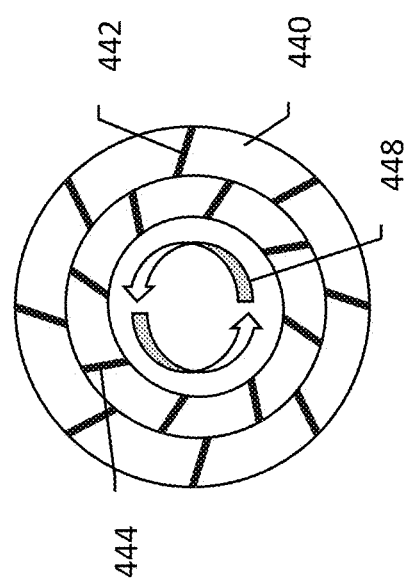

FIG. 8E shows a backplate 440 with first, outer spiral grooves 442 and second, inner spiral grooves 444, which may be offset from the outer grooves 442, as shown. The direction of turbine wheel motion is shown at 446. Thus, here, the angle of both inner and outer spiral grooves 442, 444 is in the same direction as turbine wheel rotation 446. The similar angle grooves 442, 444 may again provide a greater area of air bearing between the turbine wheel and the backplate and/or turbine housing.

Figure 8F:
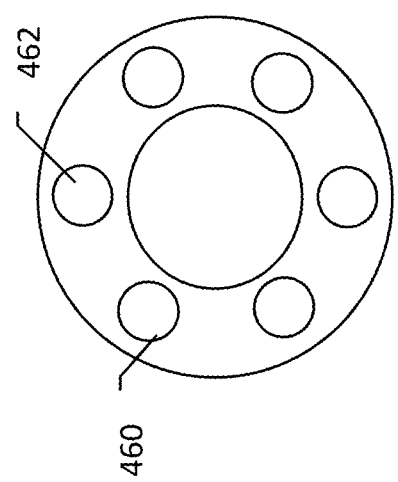

FIG. 8F shows another example. Here, the backplate 460 includes a plurality of indentations as shown at 462, arranged herein a simple pattern along lines extending out from the center point of the device. Each indentation may have the same shape/size, as shown at 462 in FIG. 8F. Alternatively, there may be various shapes and sizes present.

Figure 8G:
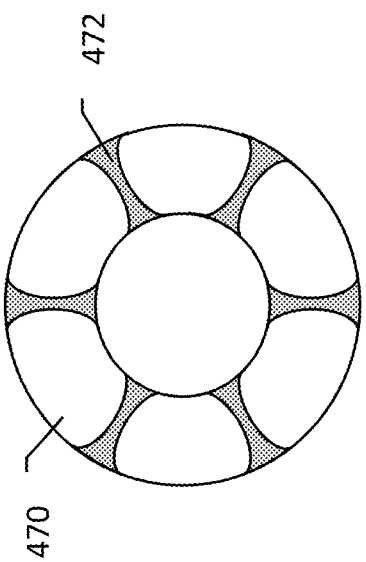

FIG. 8G shows another example. The backplate 470 includes several channels 472 that vary in width and/or depth from central to outer portion thereof An "hourglass" shape is shown in FIG. 8G, wide at the inner end and outer end, and narrower in the middle. Such a shape may draw air in at the outside edge and increase local pressure as the channel narrows, while air subject to centripetal forces is likewise pushed into the wider portion of the channel at the inner edge and then increases in pressure as the channel narrows. The opposite may be used, narrower at the inner end and outer end and wider in the middle. In still other examples, channels may be wider at the outer end and narrower at their inner end, or the reverse.

The grooves can be spiral, extending in the same direction as the spin of the turbine when subject to force imparted by the exhaust flow from the combustion chambers of the engine, or in the opposite direction thereof. The grooves can be straight (FIG. 8A), radiating outward from a center point of rotation. Grooves may vary in shape from one end to the other, such as changing width as in FIG. 8G, or depth, or by having a first portion going in a first direction and a second portion in a different direction as in FIGS. 8D-8E, for example.

Figure 9A:
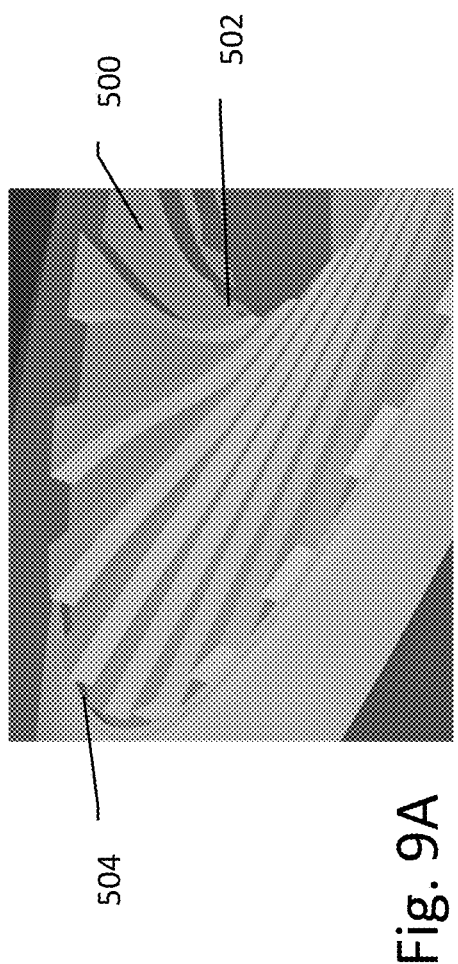
FIGS. 9A-9C show several details of groove designs with open and closed ends.
Figure 9B:
Figure 9C:
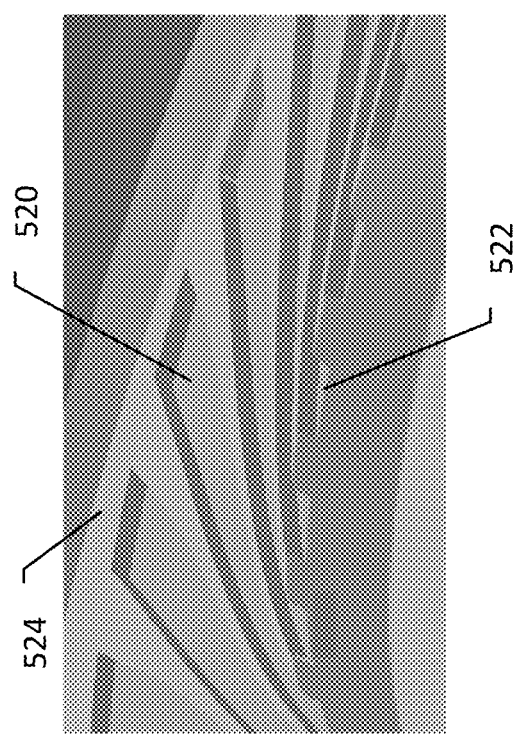

FIGS. 9A-9C show several details of groove designs with open and closed ends. In FIG. 9A, grooves 500 have open inner ends 502 and open outer ends 504. This is one option. In FIG. 9B, the grooves 510 have closed inner ends 512 and open outer ends 514. In FIG. 9C, the grooves 520 have open inner ends 522 and closed outer ends 524. Other examples may have both the closed inner ends, as shown at 512 in FIG. 9B, and closed outer ends as shown at 524 in FIG. 9C.

Figure 10A:
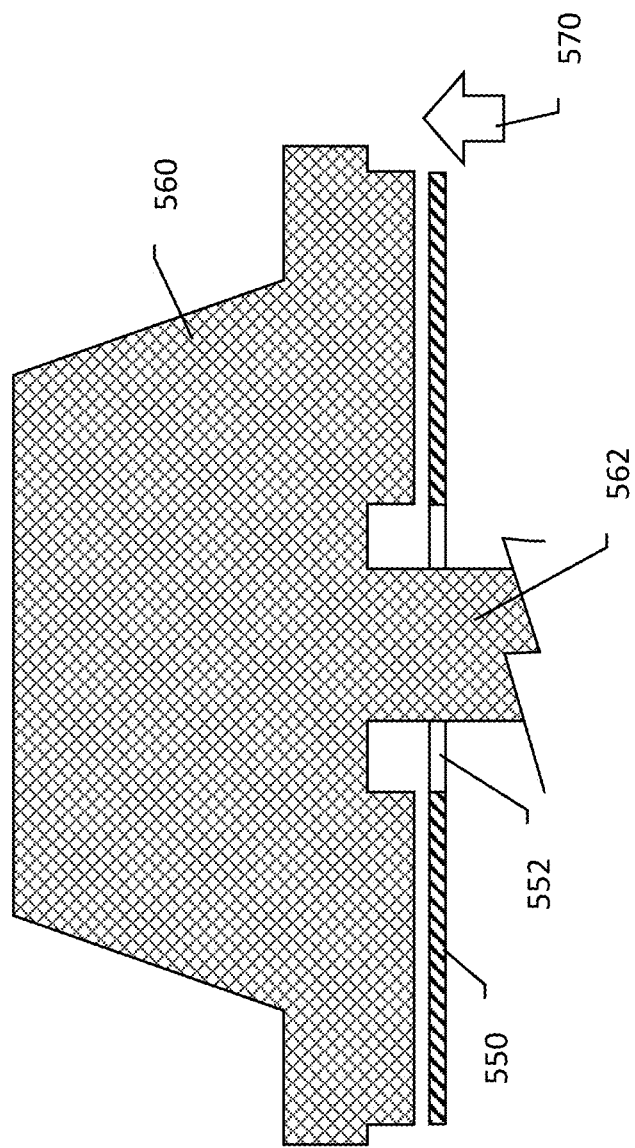
FIGS. 10A-10B show contours for turbine wheel and backplate or housing design.
Figure 10B:
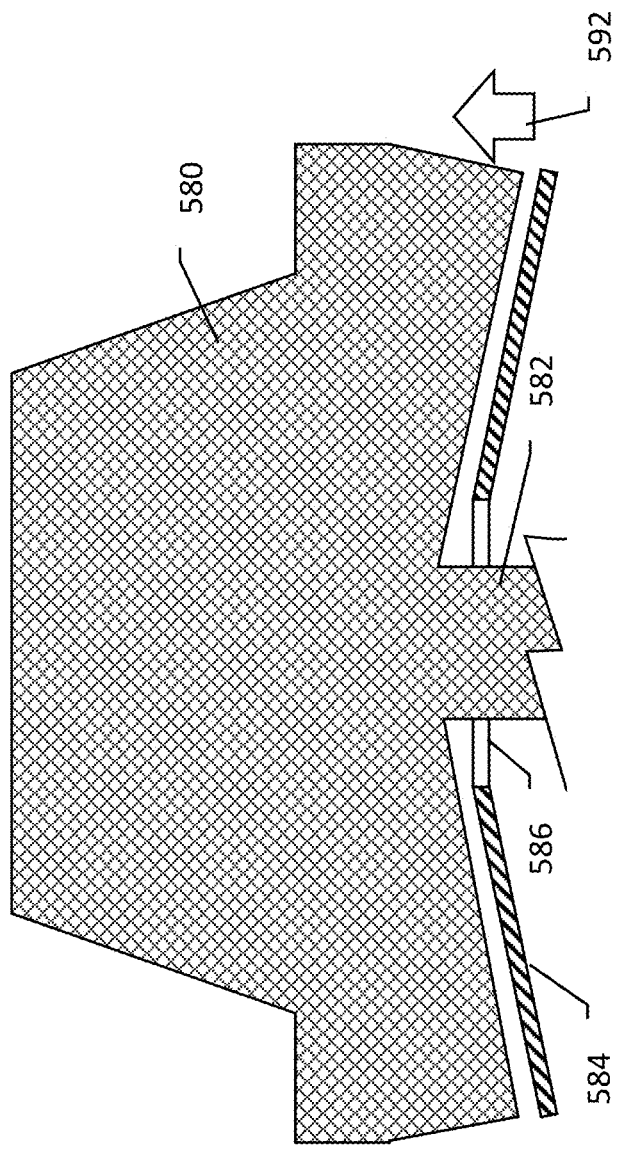

FIGS. 10A-10B show contours for turbine wheel and backplate or housing design. As noted previously, the shape of the surface on which the grooves are positioned or made can be described as annular, that is, having an inner, non-zero circumference and an outer edge. In a side section view, such as that of FIG. 10A, the backplate or housing as shown at 550 may be generally flat, with a central opening at 552 through which the turbocharger shaft 562 extends from the turbine wheel 560.

In FIG. 10B, the housing or backplate 584 appears as a frusto-conical surface, that is, a truncated cone. The inner portion thereof defines the inner circumference of the annual surface at 586, with the turbocharger shaft 582 extending therethrough. The side of the turbine wheel 580 that is nearest the housing or backplate 584 has a corresponding shape.

In each of FIGS. 10A and 10B, it can be understood that the turbocharger shaft 562 or 582 rotates about a rotational axis. The thrust force generated at the turbine, as shown at 570 and 592 is parallel to the rotational axis.

Turning back to FIG. 1, further discussion of a system having an engine with turbocharger is provided. The system 100 includes an engine 110 having an (air) intake manifold 114, and exhaust manifold 116 and a plurality of cylinders. The engine cylinders receive fuel input by fuel injectors 112. Each fuel injector 116 is adapted to provide a variable charge of fuel for each cycle of the cylinder (generally). The amount of fuel injected is determined by a control signal.

The air system of the engine system 100 is shown in some detail. Ambient air 102 is received and filtered to remove particulates by an air filter (not shown), which is followed by a mass air flow (MAF) sensor 120. The MAF sensor 120 determines a mass flow entering the system. The MAF sensor 120 may be omitted in some systems.

As used herein, when air passes through an element, the position before the air passes through the element is referred to as "upstream," and the position after the air passes through the element is referred to as "downstream." For example, as shown, air passes through the MAF sensor 120 and then goes to the compressor 124 of turbocharger 122, therefore the compressor 124 is downstream of the MAF sensor 120, and the MAF sensor 120 is upstream of the compressor 124. Ambient air conditions may be sensed as indicated at position 0 with pressure, temperature and/or other sensors to determine, for example and without limitation, ambient air pressure, temperature and humidity as air flow 102 enters the system.

In the example shown, the air passing through the MAF sensor 120 goes to a compressor 124 of a turbocharger 122. The turbocharger 122 provides torque to the compressor 124 from a turbine 126 positioned in the exhaust gas airflow from the engine 110. Using this torque, the compressor 124 will compress the air, raising the pressure and temperature thereof, which may also be referred to as charging the air. Air pressure at the intake to the compressor 124 (position 0a) can be estimated from a model using the output of the MAF sensor 220 and ambient conditions at position 0. In some configurations, a pressure sensor may be provided at the output of the compressor, providing a boost pressure measurement for position 1. In some other configurations the pressure at position 1 may be calculated or estimated from a model using, for example a throttle model and a sensed pressure at the intake manifold of the engine 110. Optionally, the turbocharger 122 may include an E-Turbo motor 128 which obtains electrical power from the engine output (the drive shaft, for example) and may be associated with a battery if desired.

To enhance efficiency of the engine 110 (and limit temperature extremes) the compressed air then passes through a charge air cooler (CAC) at 130. Downstream of the CAC 130 is an adjustable choke valve (ACV), shown at 132. The ACV 132 serves as the throttle in the system 100. A recirculation valve (RCV) may be included, if desired. The RCV may be placed to allow recirculation of the output of the compressor back to its input, enabling prevention of turbocharger surge and operating to reduce pressure at the compressor output if the ACV 132 is closed, for example.

Air passing through the ACV 132 goes to the engine intake manifold 114. An intake manifold absolute pressure sensor and temperature sensor are provided at the intake manifold, providing pressure and temperature readings at position 2. The air enters the cylinders of the engine 110, where combustion with fuel injected by the fuel injector 112 occurs. Following combustion, the air, now mixed with fuel (at least some of which has combusted) exits the engine at the exhaust manifold 116. Temperature at location 3, as shown, can be estimated according to a model by the system monitor using several inputs including the measured conditions at position 2 along with engine speed and fuel injection parameters, where the engine speed is measured by well-known magnetic measuring device, and fuel injection parameters are obtained from the fuel injector 112 control signal. Further inputs for estimating temperature at location 3 may include estimated charge mass flow (summation of the measured mass through the MAF sensor and estimated EGR flow) and, typically, using ignition angle and air-to-fuel ratio. Although pressures and temperatures along the exhaust side may be measured if desired, this is not typically the case. Instead the exhaust side temperatures and pressures are typically estimated using the air path model, accounting for individual component models described below and can be computed by solving a set of equations which are then solved iteratively.

The exhaust gasses from the exhaust manifold 116 are directed back to the turbocharger 122 and power the turbine 126. A portion of these exhaust gasses may be circulated back to the intake manifold through a high-pressure exhaust gas recirculation (EGR) valve 134 (which may also be use with an EGR cooler, not shown), where the inert recirculating gas can be used to enhance combustion properties including reducing combustion temperatures.

As the exhaust air passes through the turbine 126, the turbine spins and drives the compressor 124, with or without aid from the E-Turbo 128. The turbine 126 and/or compressor 124 of the turbocharger 122 may include variable geometries, if desired. For example, turbine 126 may be a variable nozzle turbine (VNT). The E-Turbo 128 may, optionally, enhance operation of the turbocharger 122, particularly at low engine speeds where the turbine 126 may not provide sufficient force to the drive the compressor 124 to sufficiently charge the airflow to desired pressure levels.

A wastegate (WG) 140 is provided to control the turbocharger 122. In the design shown, the WG 140 is a controllable valve that selectively allows exhaust gasses from the exhaust manifold 116 to bypass the turbine 126. To increase turbocharger 122 speed, the WG 140 position is modified to reduce the quantity of gas passing through the WG 140; conversely, to reduce turbocharger 122 speed, the WG 140 position is modified to allow more gas through the WG 140. In some examples only one of the VNT or WG 140 is included, though both may be included in other examples.

Pressure and temperature at position 4, exiting the turbine 126, can be estimated from an iterative problem solution, determining estimates in a counter-flow manner starting from ambient pressure at the exhaust port (tail pipe, for example) and working backward to the exhaust manifold for pressures, and for temperatures starting with the exhaust manifold temperature and working downstream to positions 3, 4 and 5. After exiting the turbine, the exhaust gasses are subjected to after-treatment, here shown as a three-way catalytic (TWC) converter unit 142. The design shown may be for a gasoline engine; different and/or additional after-treatment components may be included for other fuels. For example, a diesel engine may include a particulate filter, NOx trap, etc., as desired.

A low pressure EGR system is provided, with an EGR cooler 150 and a low pressure EGR valve 152, coupled to the exit of the TWC 142. The exhaust gasses are first cooled by the EGR cooler 150 and then pass through the EGR valve 152. By recirculating exhaust gasses, the composition of the airflow into the compressor 124 can be controlled. The use of an EGR, generally, is well known in the art as allowing the introduction of inert gasses into the combustion chamber of the engine. Typically, low pressure EGR 152 may also be used in a gasoline engine to reduce throttling or pumping losses and/or engine knocking. In the context of a diesel engine, high pressure EGR 134 can be useful to reduce certain environmentally harmful emissions, particularly NOx. Some examples may use a three-way EGR valve that controls both airflow from the MAF sensor and airflow from the EGR cooler 150. Some examples may omit EGR entirely or may have only one of the high pressure EGR 134 and low pressure EGR 152.

Numerous prior art references disclose control systems that can be implemented as the engine control unit 160, which may be implemented as a controller. The controller may take many forms, including, for example, a microcontroller or microprocessor, coupled to a memory storing readable instructions for performing methods as described herein, as well as providing configuration of the controller for the various examples that follow. The controller may include one more application-specific integrated circuits (ASIC) to provide additional or specialized functionality, such as, without limitation a signal processing ASIC that can filter received signals from one or more sensors using digital filtering techniques. Logic circuitry, state machines, and discrete or integrated circuit components may be included as well. The skilled person will recognize many different hardware implementations are available for a controller.

Each of these non-limiting examples can stand on its own, or can be combined in various permutations or combinations with one or more of the other examples. The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects. Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A turbocharger comprising:
a shaft having a rotational axis;
a turbine housing;
a compressor housing;
a center housing connecting the turbine housing and compressor housing, with the shaft extending within the center housing;
a turbine wheel disposed in the turbine housing and operatively connected to the shaft; and
a compressor wheel disposed in the compressor housing and operatively connected to the shaft;
further comprising a turbine backplate structure having one or more grooves adapted to generate an axial force along the rotational axis of the shaft.

2. The turbocharger of claim 1, wherein the turbine backplate structure is formed on the center housing and facing the turbine wheel.

3. The turbocharger of claim 1, wherein the turbine backplate structure is a separate piece positioned between the turbine wheel and the center housing, with the shaft passing through the separate piece.

4. The turbocharger of claim 1, wherein the one or more grooves extend inward from a first circumference to a second circumference on the turbine backplate structure.

5. The turbocharger of claim 4, wherein the one or more grooves have a depth which varies from a first end to a second end thereof.

6. The turbocharger of claim 4, wherein the one or more grooves have a depth which does not vary from a first end to a second end thereof.

7. The turbocharger of claim 4, wherein:
the turbine housing has an inlet and an outlet,
the inlet adapted to receive exhaust gasses from a combustion chamber,
air passing from the inlet to the outlet creates a force against the turbine wheel in a first direction, and
the grooves extend from a first end at the first circumference to a second end at the second circumference in the first direction.

8. The turbocharger of claim 4, wherein:
the turbine housing has an inlet and an outlet,
the inlet adapted to receive exhaust gasses from a combustion chamber,
air passing from the inlet to the outlet creates a force against the turbine wheel in a first direction, and
the grooves extend from a first end at the first circumference to a second end at the second circumference in a direction opposite the first direction.

9. The turbocharger of claim 4, wherein the one or more grooves each have an open end at the first circumference, and a closed end at the second circumference.

10. The turbocharger of claim 4, wherein the one or more grooves each have a closed end at the first circumference, and a closed end at the second circumference.

11. The turbocharger of claim 4, wherein the one or more grooves each have an open end at the first circumference, and an open end at the second circumference.

12. The turbocharger of claim 4, wherein the one or more grooves each have a closed end at the first circumference, and an open end at the second circumference.

13. The turbocharger of claim 1, wherein the turbine housing has an inlet and an outlet, and air passing from the inlet to the outlet creates a force against the turbine wheel in a first direction, and the one or more grooves include:
an inner set of grooves with a first orientation; and
an outer set of grooves with a second orientation.

14. The turbocharger of claim 13, wherein the first orientation is in the first direction, and the second orientation is in the first direction.

15. The turbocharger of claim 13, wherein the first orientation is in the first direction, and the second orientation is opposite of the first direction.

16. The turbocharger of claim 13, wherein the first orientation is opposite of the first direction, and the second orientation is in the first direction.

17. The turbocharger of claim 13, wherein the first orientation is opposite of the first direction, and the second orientation is opposite of the first direction.

18. The turbocharger of claim 1, further comprising an electric motor coupled to the shaft, the electric motor configured to provide torque to the shaft in response to a control signal from a controller, wherein the controller is configured to generate the control signal to maintain a minimum speed on the shaft to thereby provide thrust bearing force using the grooves.

19. An engine system comprising an engine having one or more combustion chambers, an intake manifold, an exhaust manifold, and a turbocharger as in claim 1, wherein the intake manifold is coupled to an airflow system which provides charged air from the compressor housing to the intake manifold, and the exhaust manifold is coupled by an exhaust system to the turbine housing.

20. A method of controlling a turbocharger comprising:
monitoring a speed of the turbocharger relative to a lower boundary; and
controlling the speed of the turbocharger to stay above the lower boundary;
wherein the turbocharger includes:
a shaft having a rotational axis;
a turbine housing;
a compressor housing;

a center housing connecting the turbine housing and compressor housing, with the shaft extending within the center housing;

a turbine wheel disposed in the turbine housing and operatively connected to the shaft;

a compressor wheel disposed in the compressor housing and operatively connected to the shaft; and a turbine backplate structure having one or more grooves adapted to generate an axial force along the rotational axis of the shaft when the turbocharger is operated at or above the lower boundary.

* * * * *